Feb. 2, 1965   A. R. JOHNSON   3,168,181
TYPE ACTION
Filed July 16, 1962   2 Sheets-Sheet 1
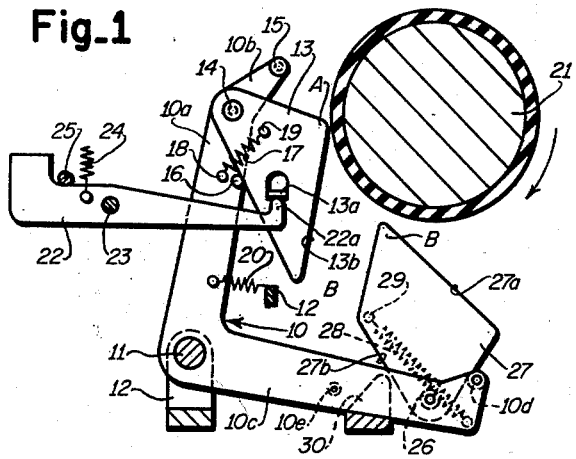
Fig_1
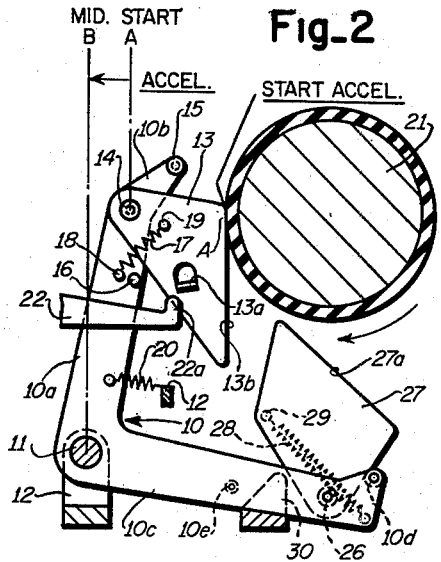
Fig_2
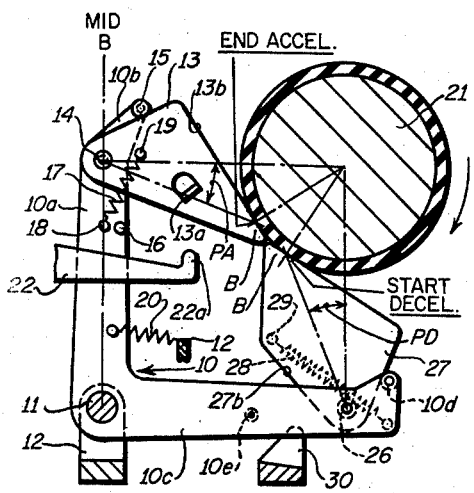
Fig_3
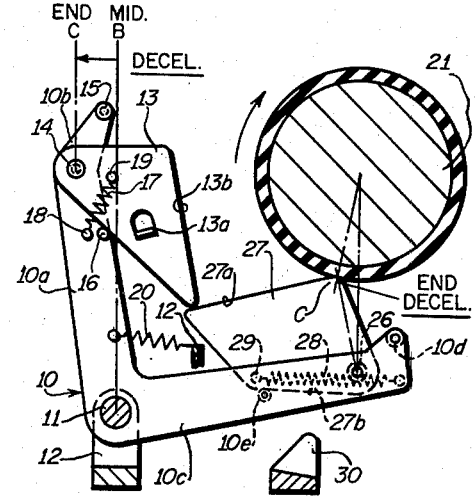
Fig_4
INVENTOR
ARTHUR R. JOHNSON
BY Thomas S. Ross
James R. Black
ATTORNEYS

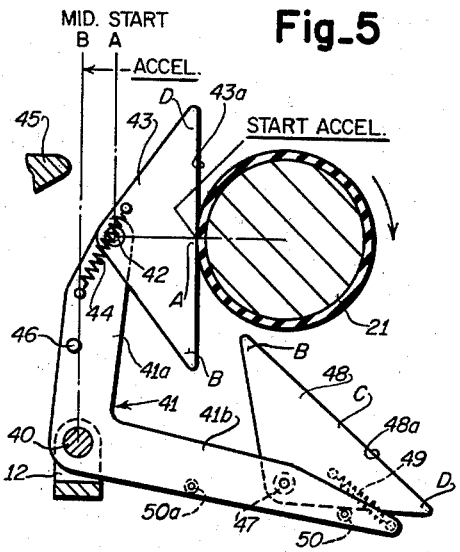
Fig_5
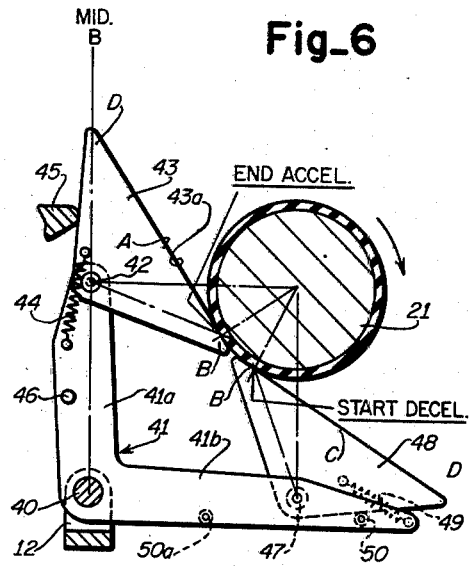
Fig_6
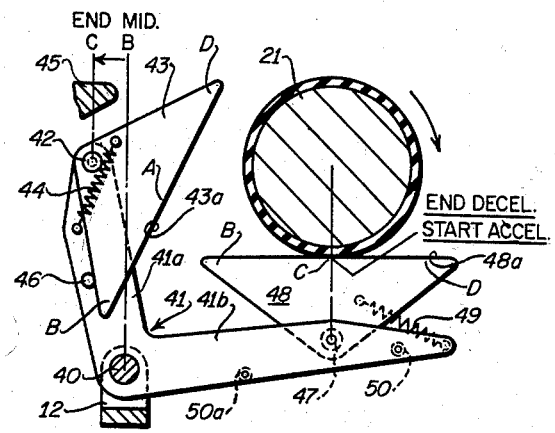
Fig_7
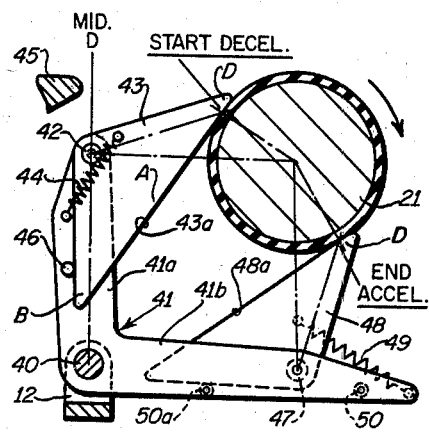
Fig_8
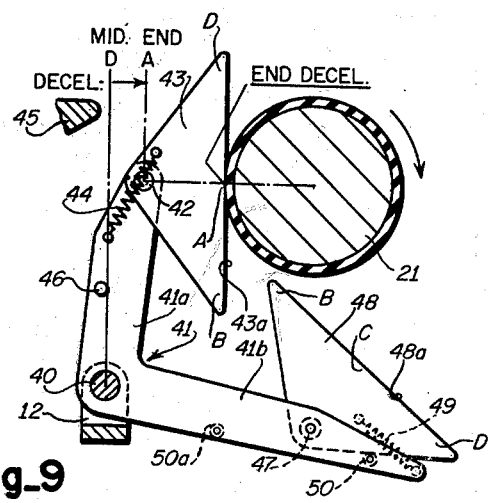
Fig_9
INVENTOR
ARTHUR R. JOHNSON
BY Thomas S. Ross
James R. Black
ATTORNEYS United States Patent Office 3,168,181
Patented Feb. 2, 1965

3,168,181
TYPE ACTION
Arthur R. Johnson, Wethersfield, Conn., assignor to Royal McBee Corporation, New York, N.Y., a corporation of New York
Filed July 16, 1962, Ser. No. 210,018
9 Claims. (Cl. 197—17)

This invention relates to a mechanism for providing unlimited control of acceleration and deceleration of a cam driven member.

In conventional accelerating mechanisms where a roll cam is used for accelerating a cam driven member, the initial point of contact between the cam and the drive roll lies on a line passing through the centers of the cam and roll or somewhere between this line and a point opposite to the direction of rotation of the roll. As the velocity of the cam driven member increases, the contact point between the cam and roller moves further in a direction opposite to the direction of rotation of the roll. In a conventional 360 degree roll cam, whether it be a single cam with spring return or a double cam to provide deceleration, the deceleration is effected by the contact point between the roll and cam moving in the same direction as that of the rotation of the drive roll. This fact limits the deceleration of the cam driven member by the velocity of the drive roll and the design geometry and sizes of the roll and cam.

It is accordingly an object of the invention to provide a deceleration mechanism capable of effecting unlimited deceleration control through the use of a second roll cam whose contact point with the drive roll lies away from the line passing through the centers of the cam and drive roll in the same direction as that of the roll's rotation, deceleration being effected by the contact point moving in the direction opposite to that of roll rotation.

In the drawing wherein I have shown two embodiments of the invention and wherein similar reference characters refer to similar parts throughout the several views:

FIGURE 1 is a schematic view of one embodiment of the invention showing the mechanism in its normal or rest condition;

FIGURE 2 is a first active schematic view showing the mechanism triggered to starting acceleration condition;

FIGURE 3 is a second active schematic view showing the condition of the mechanism at the end of the acceleration portion and the beginning of the deceleration portion of the cycle of operation;

FIGURE 4 is a third active schematic view showing the condition of the mechanism at the end of the deceleration portion of the cycle;

FIGURES 5–9 are active schematic views of another embodiment of the invention wherein the acceleration and deceleration of a continuously oscillating element is completely controlled; FIGURE 5 showing start of acceleration in one direction of reciprocation; FIGURE 6 showing the end of acceleration and start of deceleration in said one direction; FIGURE 7 showing end of deceleration in said one direction and start of acceleration in the opposite direction; FIGURE 8 showing end of acceleration and start of deceleration in said opposite direction; and FIGURE 9 showing end of deceleration in said opposite direction.

Illustratively, the mechanism of FIGURES 1–4 may be applied to an electric typewriter or the like for controlling carriage escapement acceleration and deceleration or back spacing acceleration and deceleration.

As shown in FIGURE 1, a bell crank generally indicated at 10, is pivotally secured to the machine frame 12 by a pin 11 about the axis of which the bell crank may rock counterclockwise and clockwise through one cycle of operation. Bell crank 10 is disclosed for illustrative purposes only, as other types of driven elements are contemplated herein. Bell crank 10 includes an arm 10a on the outer end of which a roll cam 13 is rockably carried by a pin 14 secured to the arm. Arm 10a also includes a finger 10b on which a cam stop 15 is mounted to limit counterclockwise movement of cam 13. Another cam stop 16 is mounted on arm 10a to limit clockwise movement of the cam by the bias of a spring 17 connected at its opposite ends to pins 18 and 19 secured respectively to arm 10a and cam 13.

A bell crank return spring 20 has one end secured to machine frame 12 and the other to crank arm 10a thus to bias the crank arm and accordingly cam 13 clockwise toward a power roll 21. A trigger 22 is pivotally mounted on a pin 23 carried by frame 12 and has a finger 22a that normally underlies a lip 13a projecting outwardly from cam 13. A spring 24 has one end connected to frame 12 and the other to trigger 22 to bias the trigger clockwise against a stop 25. It will now appear that the mechanism may be triggered to institute a cycle of operation by rocking trigger 22 counterclockwise against the pull of spring 24 and subsequently spring 17, thus to move finger 22a from under cam lip 13a whereby the cam is rotated about pivot 14 thus engaging the power roll. Meanwhile spring 20 is sufficiently strong to prevent counterclockwise rotation of the bell crank 10 under the action of the trigger as shown in FIGURE 2.

Cam 13 is the accelerating cam. When its surface 13b engages power roll 21 at the point A, the accelerating portion of the cycle is started. Cam surface 13b, after engaging the surface of power roll 21 preferably at point A, which lies on a line passing through the centers of cam 13 and roll 21, in effect climbs upwardly to its FIGURE 3 position against stop 15. Starting point A could be somewhat off the line passing through the cam and roll centers toward point B and still operate satisfactorily but would have initial acceleration greater than zero. This position marks the end of the acceleration portion of the cycle during which the contact point between the cam and roll moves from A (FIGURE 2) to B (FIGURE 3) in a direction opposite to the direction of rotation of the roll; points A and B, with the cam axis thus defines the pressure angle PA. Crank arm 10a is thus accelerated counterclockwise from zero to maximum velocity as the effective cam radius increases from point A to point B, the latter of which marks the start of the deceleration portion of the cycle.

Bell crank 10 includes another arm 10c (FIGURE 3) carrying a pin 26 on its outer end on which a decelerating cam 27 is rockably mounted. An overcentering spring 28 has one end connected to the outer end of arm 10c beyond the center of pin 26 and its other end connected to a pin 29 on cam 27. In the FIGURE 3 condition of the mechanism, spring 28 is overcentered clockwise so as to hold cam 27 in its normal position against a stop 10d on crank arm 10c where it is in condition to effect deceleration of bell crank 10.

Deceleration of the bell crank begins when it reaches the FIGURE 3 position, i.e. at the end of the acceleration portion of the cycle. Thus surface 27a of cam 27 under the bias of spring 28 engages power roll 21 at point B, which, it will be noted, is spaced from the line through the axes of the cam and roll in the direction of rotation of the power roll to form the pressure angle PD. Continued counterclockwise motion of crank 10 from FIGURE 3 to FIGURE 4 position is due to kinetic energy stored in the inertia load associated with crank 10. As deceleration of the bell crank progresses to the end of the deceleration portion of the cycle (see FIGURE 4) the contact point between cam surface 27a and roll 21 moves from B to C in a direction opposite to that of the direction of rotation of the roll, thus smoothly decelerating the velocity of the bell crank 10 to zero as the effective radius of the cam decreases. As cam 27 moves from its FIGURE 3 to its FIGURE 4 position, spring 28 overcenters (see FIGURE 4) and the cam subsequently comes to rest against the limit stop 10e. Thus when return spring 20 rocks bell crank 10 clockwise back to normal or rest position (FIGURE 1), edge 27b of cam 27 engages a cam reset 30 which causes spring 28 to overcenter in the opposite direction to hold cam 27 in its normal or rest position against cam stop 10d. At the same time lip 13a on cam 13 comes to rest on trigger finger 22a so that the several parts are reconditioned for another cycle of operation.

It may now be seen that by so relating cam 27 to power roll 21 that the contact point therebetween moves opposite to the direction of roll rotation, just the reverse of the relative movement in conventional systems, it is possible to obtain unlimited or complete deceleration control regardless of roll speed or the size of the cam and roll.

Where it is desirable completely to control the acceleration and deceleration of a continuously oscillating element, that embodiment of the invention shown in FIGURES 5–9 may advantageously be used. Such a mechanism could be applied as part of the drive in a tape punching machine for driving the punch and/or operating the tape feeding mechanism.

Referring first to FIGURE 5, the machine frame 12 pivotally supports, as by a pin or shaft 40, a bell crank, generally indicated at 41, having two arms 41a and 41b. A pin 42 mounted on the end of crank arm 41a pivotally supports a roll cam 43 whose surface 43a is adapted to engage the surface of power roll 21. An over-centering spring 44 attached at its opposite ends to crank arm 41a and 43 respectively biases cam 43 counterclockwise against roll 21 at the start of the cycle so that the roll engages cam surface 43a at point A thereon which preferably lies on a line passing through the axes of roll 21 and cam 43 but may be somewhat spaced therefrom toward point B in which event initial acceleration would be greater than zero. As roll rotation continues from the FIGURE 5 to the FIGURE 6 position, i.e. starts and ends a counterclockwise bell crank accelerating portion of a cycle operation, cam surface 43a travels over the roll surface from point A to point B thus causing counterclockwise acceleration of bell crank 41 and counterclockwise movement of cam 43 to a point where the upper end of its surface engages a stop 45. It should be noted that the contact point between the cam and power roll in moving from A to B has moved in a direction opposite to the direction of rotation of the power roll thus providing completely controlled counterclockwise acceleration of bell crank 41. At this point the bell crank is in free flight, caused by the stored kinetic energy of the inertia load associated with crank 41, the continuing counterclockwise movement of the bell crank and the cam causing stop 45 to rock cam 43 clockwise about its pivot 42 to over-center spring 44 clockwise, the spring accordingly urging the cam to rest against a stop 46 on crank arm 41a as shown in FIGURE 7.

Bell crank arm 41b has secured thereto a pin 47 on which another roll cam 48 is rockably mounted; a spring 49, connected at its opposite ends to cam 48 and arm 41b respectively, being provided to bias cam 48 clockwise against a stop 50 on arm 41b when the parts are in the FIGURE 5, 6 and 9 positions. When the system is in the condition shown in FIGURE 6, i.e. at the end of the counterclockwise acceleration of bell crank 41, roll 21 is engaged by surface 48a of the roll cam at point B thereof to start the counterclockwise bell crank deceleration portion of the cycle, it being noted that point B on the cam surface lies outside of the line passing through the axes of roll 21 and cam 48 in the direction of rotation of the roll.

As counterclockwise deceleration of the bell crank progresses from the FIGURE 6 start position to the FIGURE 7 end position, the point of roll contact on cam surface 48a moves from point B to point C lying on a line passing through the axes of the cam and roll, i.e. in a direction opposite to the direction of rotation of roll 21 thus assuring completely controlled and gradual or infinite, as may be desired, counterclockwise deceleration of the crank.

Clockwise acceleration of the bell crank 41 starts when the parts are in the FIGURE 7 position wherein roll 21 engages cam surface 48a at point C thereon, it being recalled that this point of the cam surface lies on a line passing through the axes of the roll and cam. As clockwise acceleration of the bell crank progresses from the FIGURE 7 position (zero velocity) to the FIGURE 8 position (maximum velocity) the point of contact on cam surface 48a moves from C to D in a direction opposite to that of the roll rotation, point D accordingly lying outside of the line passing through the axes of the roll and cam in direction of rotation of the roll, thus assuring completely controlled clockwise acceleration of the cam. Further counterclockwise cam rotation is prevented by kick off stop 50a as did stop 45 for cam 43.

The end of clockwise acceleration of the bell crank 41 (see FIGURE 8) coincides with the start of clockwise deceleration thereof at which time cam 43 has moved to a position where roll 21 engages its surface 43a at point D thereon, this point lying outside of a line passing through the axes of the roll and cam in the direction of rotation of the roll. At this time spring 49 rocks cam 48 clockwise to its rest position against stop 50 on crank arm 41b. As clockwise deceleration progresses from the FIGURE 8 position to the FIGURE 9 position, the point of contact between roll 21 and cam surface 48a moves from point D to point A in a direction opposite to the direction of roll rotation, the point A lying on the line passing through the axes of the roll and cam and marking, not only the end of clockwise bell crank deceleration, but also the completion of a cycle of operation during which counterclockwise and clockwise acceleration and deceleration were completely controlled.

As other embodiments of the invention are possible, and as variations may be made in those shown, all without departing from the scope of the invention, it should be understood that the foregoing should be interpreted as illustrative and not in a limiting sense.

I claim:
1. In a mechanism of the nature described, in combination,
   a frame,
   a power roll rotatably mounted on said frame,
   a driven member mounted for oscillatory movement on said frame toward and away from said roll,
   a roll cam rockably mounted on said member and adapted to engage said roll so as to be rocked thereby to impart accelerating motion to said member as long as the cam remains in engagement with the roll,
   a second roll cam rockably mounted on said member and adapted to engage said roll upon disengagement thereof by said first cam so as to be rocked by said roll to decelerate said member, means to impart continuous oscillatory movement to said member, and
   spring means to bias each of said cams toward its point of engagement with said power roll, each of said cams having an accelerating surface and a decelerating surface that are serially effective to accelerate and decelerate said member twice during one oscillation of said member.

2. Mechanism in accordance with claim 1 wherein the point of engagement of said first cam with said power roll at the start of acceleration lies on or near a line passing through the axes of said cam and roll and the point of disengagement of said cam from said roll at the end of acceleration is spaced from said line in a direction opposite to the direction of rotation of said roll.

3. Mechanism in accordance with claim 1 wherein the point of engagement of said second cam with said power roll at the start of deceleration is spaced from a line passing through the axes of said second cam and roll in the same direction as that of the rotation of said roll and the point of engagement of said second cam with said roll at the end of deceleration lying on or near said line whereby the point of engagement between said second cam and said roll moves in a direction opposite to the direction of rotation of said roll during deceleration.

4. Mechanism in accordance with claim 1 including
  means to impart continuous oscillatory movement to said member, and
  spring means to bias each of said cams toward its point of engagement with said power roll.

5. Mechanism in accordance with claim 1 including an overcentering spring having one end connected to said member and the other to one of said cams and effective during a cycle of operation to rock said one cam from inoperative to operative position with respect to said power roll.

6. Mechanism in accordance with claim 1 including a spring having one end connected to said frame and the other to said member and biasing said member toward said power roll whereby the kinetic energy expended by said roll is stored in said spring during acceleration of said member and is returned to said roll during deceleration of said member by said second cam.

7. Mechanism according to claim 5 wherein said spring is connected to said second cam.

8. Mechanism according to claim 5 including cam reset means located to engage said one cam during a cycle of operation for causing said spring to overcenter.

9. In a mechanism of the nature described, in combination,
  a frame,
  a power roll rotatably mounted on said frame,
  a two-armed lever rockably mounted on said frame,
  a roll cam rockably mounted on one arm of said member and adapted to engage said roll so as to be rocked thereby to impart accelerating motion to said member as long as the cam remains in engagement with said roll, the point of engagement of said cam with said roll at the start of acceleration lying on or near a line passing through the axes of said cam and roll, said point of engagement at the end of acceleration being spaced from said line in a direction opposite to the direction of rotation of said roll,
  a second roll cam rockably mounted on the other arm of said member and adapted to engage said roll upon disengagement thereof by said first cam so as to be rocked by said roll to decelerate said member, the point of engagement of said second cam with said roll at the start of deceleration being spaced from said line in the same direction as that of the rotation of said roll, said last mentioned point of engagement at the end of deceleration lying on or near said line whereby said last mentioned point moves in a direction opposite to the direction of rotation of said roll during deceleration of said member.

References Cited by the Examiner
UNITED STATES PATENTS

| | | | |
|---|---|---|---|
| 1,227,846 | 5/17 | Smathers | 197—17 |
| 1,963,285 | 6/34 | Woodward | 197—17 X |
| 3,021,934 | 2/62 | Enders | 197—17 |

ROBERT E. PULFREY, *Primary Examiner.*